United States Patent

[11] 3,619,369

[72] Inventors Hiroshi Onishi;
  Toshiyuki Suzuki, both of Noda-shi, Japan
[21] Appl. No. 840,034
[22] Filed July 8, 1969
[45] Patented Nov. 9, 1971
[73] Assignee Noda Institute for Scientific Research
  Noda-shi, Japan
[32] Priorities Oct. 31, 1968
[33]   Japan
[31]   43/78944;
    Oct. 31, 1968, Japan, No. 43/78945

[54] PROCESS FOR PRODUCING XYLITOL BY FERMENTATION
  7 Claims, No Drawings
[52] U.S. Cl. .................................................. 195/37,
      195/43
[51] Int. Cl. ..................................................... C12c 1/00
[50] Field of Search ........................................... 195/37, 42,
      111, 43

[56]      References Cited
      UNITED STATES PATENTS
2,986,495  5/1961  Onishi .......................... 195/37

OTHER REFERENCES

Onishi et al., " Production of Xylitol...," Agr. Biol. Chem., Vol. 30, p. 1139–1144, 1966
Utter, " Carbohydrate Metabolism," Annual Review of Biochemistry, Vol. 27, p. 252–257, 1958
Moses et al., " Preparation of D-Xylulose," C. A. Vol. 57, #3861b, 1962.

*Primary Examiner*—A. Louis Monacell
*Assistant Examiner*—Gary M. Nath
*Attorney*—Cushman, Darby & Cushman ABSTRACT: A process for producing xylitol by fermentation (xylitol is useful as sweetening materials or treating agents of diabetics), which comprises (i) culturing yeasts, for example, Debaryomyces sake (ATCC 20,212) in a culture medium containing glucose so as to produce D-arabitol, (ii) after the sterilization of said culture medium, culturing acetic acid bacteria, for example, Acetobacter suboxydans ATCC 621 therein so as to produce D-xylulose, and further, (iii) with or without separating D-xylulose from said broth, culturing yeasts, for example, Candida guilliermondii var. soya ATCC 20,216 in a culture medium containing the D-xylulose as a sugar source so as to produce xylitol.

PROCESS FOR PRODUCING XYLITOL BY FERMENTATION

BACKGROUND OF THE INVENTION

Field of the Invention

The present invention relates to a process for obtaining xylitol from D-xylulose by fermentation. Moreover, the present invention relates to a process for obtaining xylitol from glucose through D-xylulose by fermentation, successively.

Description of Prior Art

Xylitol has been used as sweetening materials or medicines for treatment of diabetes. Xylitol is produced by the reduction of D-xylose. However, economical conversion and recovery of xylose has not yet been effected so that xylitol cannot be considered a commercially available polyol. (*Encyclopedia of Chemical Technology*, the Interscience Encyclopedia Inc. New York, vol. 1, p. 323). D-xylose is expensive, and accordingly, xylitol is also very high-priced.

The object of the present invention is to provide a process for producing xylitol from D-xylulose by fermentation. D-xylulose which is a starting material of the objective substance is easily produced from glucose by fermentation successively. Accordingly, the present invention is economically valuable because xylitol is obtained from glucose at low cost.

In order to obtain D-xylulose from glucose, D-arabitol is first produced from glucose and subsequently, the resulting arabitol is converted into D-xylulose. The former procedure (glucose→D-arabitol) is well known see, for example, C.A. 59, p. 3288f (1963) and C.A. 59, p. 1054h (1963). Namely, it comprises inoculating *Pichia miso* (ATCC 20,210), *Torulopsis famata* (ATCC 20,214) and *Candida polymorpha* (ATCC 20,213) in a culture medium containing glucose as a main sugar source and conducting the cultivation under aerobic conditions. Further, the latter procedure (D-arabitol→D-xylulose) is also well known and it depends upon the action of *Acetobacter suboxydans* (ATCC 621). However, these well-known methods are conducted in a single step and no method for conducting them successively has been reported. The successive method is very convenient because a yeast growing in former procedure is sterilized with heating so as to obtain a yeast extract and the resulting yeast extract is used as a nutritional source of acetic acid bacteria in the latter procedure.

SUMMARY OF THE INVENTION

The present invention relates to a process for producing xylitol from glucose by fermentation which comprises inoculating yeasts capable of producing D-arabitol from glucose in a culture medium containing glucose as a main sugar source, conducting culturing under aerobic conditions so as to produce and accumulate D-arabitol, subsequently inoculating acetic acid bacteria into said medium so as to oxidize and ferment resulting D-arabitol, thereby, producing D-xylulose. Moreover the present invention also relates to inoculating yeasts capable of producing xylitol from D-xylulose in a culture medium containing the D-xylulose as a sugar source, conducting cultivation and fermentation thereof under aerobic conditions and consequently, obtaining xylitol. If commercially available, D-xylulose can be used to produce xylitol according to the above-mentioned process. The following discussion demonstrates the process of this invention wherein commercially available glucose is utilized as the starting material.

I. Production of D-arabitol from glucose

A process for producing D-arabitol in high yield by aerobic fermentation of yeasts by use of glucose as a main sugar source has already been clarified by one of the present inventors. C.A. 59, p. 3288f (1963) and C.A. 59, p. 1054h (1963). In carrying out a process according to the invention of the present application, any yeasts which have an ability to produce D-arabitol from glucose may be used. For example, *Pichia miso* 3362 (ATCC 20,210) and *Pichia membranaefaciens* belonging to genus *Pichia, Hansenula miso β* (ATCC 20,211) and *Hansenula saturnus* belonging to genus *Hamsenula, Debaryomyces sake* (ATCC 20,212) and *Debaryomyces, miso var.* 1 belonging to genus *Debaryomyces, Saccharomyces rouxii*, (ATCC 13,356) and *Saccharomyces, acidifaciens* belonging to genus *Saccharomyces, Candida polymorpha* 3544 (ATCC 20,213) and *Candida crusei* belonging to genus *Candida* and other yeasts such as *Torulopsis famata* 3555 (ATCC 20,214), *Torulopsis osloensis, Rhodotorula rosa*, and further, the yeasts demonstrated in Hiroshi Onishi: Bull. Agr. Chem. Soc. Japan 24, 131 (1960) may be used.

In producing D-arabitol from glucose by use of these yeasts, the above-mentioned strains are precultured in an appropriate medium for the growth of micro-organisms, for example, a culture medium for fermentation, are inoculated into a culture medium containing glucose as a main sugar source and incubated. The sugar concentration can be varied in a wide range, preferably 10–30 percent. Other nutrients necessary for the growth of yeasts are added to a culture medium. As for nitrogenous compounds, organic substances such as casein hydrolyzate, peptone, amino acids, corn steep liquor, urea and the like, or inorganic substances such as ammonium sulfate, ammonium chloride, and the like are usable. Moreover, inorganic substances such as phosphates, magnesium salts, and calcium salts, yeast extract, vitamins and the like may be used.

The fermentation is conducted under aerobic conditions while maintaining the culture medium in which the above-mentioned strains have been inoculated at a temperature of about 30° C. After 2–10 days, the sugar is consumed and D-arabitol is produced and accumulated in the culture medium.

For example, in case of culturing in the sugar concentration of 30 percent by weight of glucose, the yield of arabitol based on sugar is as follows.

| | |
|---|---|
| Pichia miso 3362 (ATCC 20,210) | 29% |
| Hansenula miso β IFO–147 (ATCC 20,211) | 21% |
| Debaryomyces sake IFO–0060 (ATCC 20,212) | 35% |
| Saccharomyces rouxii (ATCC 13,356) | 22% |
| Candida polymorpha 3554 (ATCC 20,213) | 37% |
| Torulopsis famata 3555 (ATCC 20,214) | 51% |

II Production of D-xylulose from D-arabitol

The fermentation liquor containing D-arabitol as obtained above is adjusted to about pH 6.0 and is then sterilized with heating. The cell bodies of yeasts are killed and simultaneously, the component thereof is eluted in the broth. To this broth acetic acid bacteria, for example, *Acetobacter suboxydans* ATCC–621 or *Gluconobacter roseus* H₄, IAM 1840 and the like are inoculated and fermented aerobically at about 30° C. As a result, D-xylulose is produced in high yield by the oxidation of D-arabitol. The adjustment of the pH mentioned above is conducted by use of caustic soda. The extract from yeasts employed in the proceeding procedure (I) is nutritious and therefor, the broth obtained in the procedure (I) can be used as the culture medium of the present procedure as it is. As delivered above, D-xylulose can be produced from glucose according to a simple method by culturing yeasts and acetic acid bacteria successively, without conducting such complicated procedures as purification and so on.

III Production of xylitol from D-xylulose

Corn steep liquor is supplied to the fermentation liquor obtained in the above-mentioned procedure (II) as a nutritional source and this fermentation liquor is adjusted to pH 6.0 and sterilized. The fermentation is conducted by culturing yeasts capable of converting D-xylulose into xylitol under aerobic conditions.

After cell bodies of nitrogenous substances are removed from a fermentation liquor containing D-xylulose obtained by the procedure (II), the fermentation liquor is concentrated under reduced pressure so as to obtain a dried substance, and the resulting dried substance is treated by the extraction of hot ethanol to separate D-xylulose. The above-mentioned microorganisms may be cultured in a culture medium (pH about 6.0) containing the thus-isolated D-xylulose as a sugar source and other nutritional sources as mentioned above according to the conventional method to produce xylitol.

As appropriate yeasts in the present procedure, *Candida tropicalis* 3527 ATCC 20,215, *Candida arborea* ATCC *Candida guilliermondii* var. *soya* ATCC 20,216, *Pichia farinosa* ATCC 20,218, *Hansenula suaveolens* ATCC 20,219, *Monilia vini* ATCC 20,217, *Saccharomyces rouxii* ATCC 133,561, *Zygosaccharomyces polymorphus*, *Zygosaccharomyces gracilis* var. *italicus* ATCC 2623 and *Debaryomyces hansenii* ATCC 20,220 are used.

In producing xylitol from D-xylulose by use of these yeasts, the above-mentioned strains precultured in a suitable medium in which said strains are capable of growing, such as a culture medium for fermentation, are inoculated in a culture medium containing D-xylulose as a main sugar source and incubated. In this case, the concentration of D-xylulose is suitably 5–10 percent in general. Other essential nutrients necessary for the growth of yeasts are added to the culture medium. As for nitrogen compounds, organic substances such as corn steep liquor, casein hydrolyzate, peptone, amino acids, urea and the like or inorganic substances such as ammonium sulfate, ammonium chloride and so on may be used. Moreover, inorganic substances such as phosphates, magnesium salts, calcium salts and the like, yeast extract and vitamins can be used. Particularly, when the broth of the procedure (II) is used, it is sufficient to add only corn steep liquor to the culture medium in a concentration of 2–8 (w./v.) percent. The adjustment of pH is conducted by use of caustic soda.

Culturing is carried out at a temperature of about 30° C. under aerobic conditions. The fermentation is conducted for 3–6 days by conducting suitable aeration or supplying air with a shaking method.

For example, in the case of conducting the cultivation in a culture medium containing 5 (w./v.) percent of D-xylulose and casein hydrolyzate as a nitrogen source, the yield of xylitol based on sugar is as follows.

| | |
|---|---|
| *Candida tropicalis* ATCC 20,215 | 16.6% |
| *Candida guilliermondii* var. *soya* ATCC 20,216 | 25.4% |
| *Monilia vini* ATCC 20,217 | 16.2% |
| *Pichia farinosa* ATCC 20,218 | 19.6% |
| *Hansenula suaveolens* ATCC 20,219 | 7.1% |
| *Saccharomyces rouxii* ATCC 13,356 | 27.1% |
| *Zygosaccharomyces polymorphus* | 48.3% |
| *Zygosaccharomyces gracilis* var. *italicus* ATCC 2,623 | 45.8% |
| *Debaryomyces hansenii* ATCC 20,220 | 25.8% |

As shown in example 1, in the case culturing *Candida guilliermondii* var. *soya* ATCC 20,216 in a culture medium containing corn steep liquor as a nitrogen source, xylitol is obtained in the high yield of 40 percent based on sugar. The yield thereof has remarkably been elevated.

RECOVERY

A clarified solution obtained by filtering cell bodies and insoluble material from the fermentation liquor obtained by the procedure (III) is concentrated under vacuum at a low temperature of 50° C. or lyophilized to remove water. The dried materials is extracted with hot ethanol. In the case that the fermentation liquor contains D-xylulose which has not been fermented yet, it is treated with an ion exchange resin Amberlite IRA-400 (manufactured by the Organo Company) to obtain the fraction of xylitol. Seed xylitol crystal is added to the ethanol extract and then the extract is allowed to stand and crystallize. Recrystallization is conducted so as to obtain pure crystals. Thus obtained crystal has a melting point of 92.5–93.5°Φ C. and a sweet taste. The molecular formula thereof is $C_5H_{12}O_5$ and it has no optical activity. The result of the analysis of infrared absorption spectrum is entirely identical to that of xylitol. Consequently, this crystal is identified with xylitol from the above-mentioned facts.

PREFERRED EMBODIMENT OF THE INVENTION

Example 1

*Debaryomyces sake* ATCC 20,212 was inoculated in a culture medium containing 15 (w./v.) percent glucose, 4.0 (w./v.) percent corn steep liquor, 0.1 (w./v.) percent acid potassium phosphate, 0.05 (w./v.) percent magnesium sulfate, 0.01 (w./v.) percent calcium chloride, 0.01 (w./v.) percent sodium chloride and balance being water at pH 6.0 and cultured with shaking at 30° C. for 4 days. 5.34 g./100 ml. of D-arabitol was produced and accumulated consuming sugar. Further, the culture medium was adjusted to pH 6 with caustic soda and then autoclaved at 120° C. for 15 minutes. Thereinto *Acetobacter suboxydans* ATCC 621 was inoculated and oxidatively fermented at 30° C. for 2 days, thereby 5.00 g./100 ml. of D-xylulose was produced and accumulated. Next, 4.0 (w./v.) percent corn steep liquor was further added to the fermentation liquor without isolating and recovering D-xylulose from the fermentation liquor and the said fermentation liquor was adjusted to pH 6.0 and sterilized at 110° C. for 5 minutes. Thereinto *Candida guilliermondii* var. *soya* ATCC 20,216 was inoculated and cultured with shaking at 30° C. for 3 days. Consequently 2.00 g./100 ml. of xylitol was produced completely consuming sugar. The yield of xylitol from the initial glucose was 13.3 percent.

Example 2

*Candida polymorpha* ATCC 20,213 was inoculated into a culture medium consisting of 10 (w./v.) percent glucose, 0.4 (w./v.) percent casein hydrolyzate, 0.1 (w./v.) percent acid potassium phosphate, 0.05 (w./v.) percent magnesium sulfate, 0.01 (w./v.) percent calcium chloride, 0.01 (w./v.) percent sodium chloride, 0.1 (w./v.) percent yeast extract and balance being water and cultured with shaking at 30° C. for 5 days. 4.5 g. of D-arabitol was obtained per 100 ml. of the fermentation liquor.

This fermentation liquor was adjusted to pH 6 with caustic soda and autoclaved at 120° C. for 15 minutes. Thereafter, *Acetobacter suboxydans* ATCC 621 was inoculated into the said fermentation liquor and incubated at 30° C. for 2 days. Consequently, 4.5 g./100 of D-xylulose (the yield of D-xylulose from glucose was 45 percent based on sugar) was obtained.

The fermentation liquor was then separated by centrifugation so as to remove cell bodies and insoluble materials and further, nitrogenous substances was removed therefrom by the treatment of zinc sulfate. Moreover, the resulting fermentation liquor was concentrated to dryness under reduced pressure, extracted with hot ethanol, treated with active carbon to remove impurities and then, the fraction of D-xylulose was obtained by evaporating alcohol under reduced pressure.

*Candida guillumondii* var. *soya* ATCC 20,216 was inoculated in a culture medium consisting of 5 (w./v.) percent D-xylulose, 0.4 (w./v.) percent casein hydrolyzate, 0.1 (w./v.) percent acid potassium phosphate, 0.05 (w./v.) percent by weight of magnesium sulfate, 0.01 (w./v.) percent calcium chloride, 0.01 (w./v.) percent sodium chloride, 0.1 (w./v.) percent yeast extract and balance being water, by use of the resulting D-xylulose fraction and cultured with shaking at 30° C. for 3 days. Consequently, 1.4 g. of xylitol was obtained per 100 ml. of the fermentation liquor (the yield of xylitol was 12.6 percent based on glucose and 28 percent based on xylulose). The clarified solution obtained by filtering cell bodies and protein from said fermentation liquor was concentrated under vacuum or lyophilized so as to remove moisture. The dried material was extracted with hot ethanol. If D-xylulose remains unfermented, the broth was treated by an ion exchange resin IRA 400 (manufactured by the Organo Company) to remove the sugar before ethanol extraction. Seed xylitol crystal was added to this extract and kept to stand to crystallize. Pure crystals were obtained by repeating recrystallization.

In case of using respective strains of *Candida tropicalis* ATCC 20,215, *Monilia vini* ATCC 20,217, *Pichia farinosa* ATCC 20,218 and *Hansenula suaveolens* ATCC 20,219 instead of the above-mentioned *Candida guilliermondii var. soya* ATCC 20,216, the result thereof are shown in table 1.

TABLE 1

| Strain | Yield of xylitol (based on xylulose) |
|---|---|
| Candida tropicalis | 17% |
| Monilia vini | 16% |
| Pichia farinosa | 20% |
| Hansenula suaveolens | 7% |
| Saccharomyces rouxii | 27% |
| Zygosaccharomyces polymorphus | 48% |
| Zygosaccharomyces gracilis var. italicus | 46% |
| Debaryomyces hansenii | 26% |

Example 3

*Pichia miso* ATCC 20,210 was inoculated in a culture medium having the same composition as described in example 2 except that 25 (w./v.) percent glucose was used and cultured with shaking at 30° C. for 10 days. 7.5 g./100 ml. of D-arabitol was obtained.

The similar oxidation fermentation as in example 2 was conducted in this fermentation liquor using *Acetobacter suboxydans* ATCC 621 so as to obtain a D-xylulose fraction and then, it was prepared to be 5 percent concentration and subsequently, the fermentation was conducted using *Debaryomyces Hansenii* ATCC 20,220 at 30° C. for 4 days. 1.3 g. of xylitol was obtained per 100 ml. of the fermentation liquor. The yield of xylitol from glucose was 7.8 percent based on sugar.

Example 4

*Torulopsis famata* ATCC 20,214 was inoculated into a culture medium consisting of 10 (w./v.) percent glucose, 0.4 (w./v.) percent casein hydrolyzate, 0.1 (w./v.) percent acid potassium phosphate, 0.05 (w./v.) percent magnesium sulfate, 0.01 (w./v.) percent calcium chloride, 0.01 (w./v.) percent sodium chloride, 0.1 (w./v.) percent yeast extract and balance being water and cultured with shaking at 30° C. for 5 days. Consequently, 4.8 g./100 ml. of D-arabitol was produced and accumulated consuming sugar. After adjusting the fermentation liquor to pH 6 with caustic soda, it was autoclaved at 120° C. for 15 minutes. Thereinto *Gluconobacter roseus* $H_4$ was inoculated and after 2 days' oxidative fermentation at 30° C., 4 g./100 ml. of D-xylulose was produced and accumulated.

The fraction of D-xylulose was obtained by the same treatment as described in example 2. *Candida tropicalis* ATCC 20,215 was inoculated into a culture medium having the same composition as described in example 2 except that 5 percent by weight of D-xylulose was used and cultured with shaking at 30° C. for 4 days. Consequently, 0.83 g. of xylitol (the yield of xylitol from glucose was 6.6 percent was obtained per 100 ml. of a fermentation liquor.

What is claimed is:

1. A process for producing xylitol by fermentation which comprises inoculating micro-organisms selected from the group consisting of *Candida, Monilia, Pichia, Hansenula, Saccharomyces, Zygosaccharomyces* and *Debaryomyces* which are capable of producing xylitol from D-xylulose in a culture medium containing D-xylulose as a main carbon source, inorganic salts and nitrogen sources and conducting fermentation under aerobic conditions to produce and accumulate xylitol in the culture medium.

2. A process according to claim 1 wherein type pH of the culture medium is 6.0.

3. A process according to claim 1 wherein the fermentation is conducted at 30° C.

4. A process according to claim 1 wherein the micro-organisms employed are selected from the group consisting of *Candida guilliermondii var. soya* ATCC 20,216, *Candida tropicalis* ATCC 20,215, *Monilia vini* ATCC 20,217, *Pichia farinosa* ATCC 20,218, *Hansenula suaveolens* ATCC 20,219, *Saccharomyces rouxii* ATCC 13356, *Zygosaccharomyces gracilis var. italicus* ATCC 2623 and *Debaryomyces hansenii* ATCC 20,220.

5. A process for producing xylitol from glucose which comprises, firstly, inoculating yeasts selected from the group consisting of *Candida, Hansenula, Pichia, Debaryomyces, Saccharomyces, Torulopsis* and *Rhodotorula* which are capable of producing D-arabitol from glucose in a culture medium containing glucose as a main carbon source, inorganic salts and nitrogeneous source, culturing and fermenting under aerobic conditions, thereby producing and accumulating D-arabitol, secondly, adjusting the broth thus obtained to a pH of 6.0, sterilizing the broth, inoculating acetic acid bacteria selected from the group consisting of *Acetobacter suboxydans*, and *Gluconobacter roseus* $H_4$, IAM 1840 to the broth, culturing and fermenting the inoculated broth under aerobic conditions, thereby converting D-arabitol into D-xylulose, and thirdly, adjusting the broth to a pH of 6.0 and sterilizing the broth, inoculating micro-organisms selected from the group consisting of *Candida, Monilia, Pichia, Hansenula, Saccharomyces, Zygosaccharomyces* and *Debaryomyces* capable of producing xylitol from D-xylulose in the sterilized broth, culturing the sterilized broth under aerobic conditions thereby converting the D-xylulose into xylitol.

6. A process according to claim 5 wherein the fermentation is conducted by supplying corn steep liquor in a concentration of 2–8 (w./v.) percent in the above-mentioned third procedure.

7. A process according to claim 5 wherein the concentration of glucose is 10–30 (w./v.) percent.

* * * * *